US011847565B1

(12) United States Patent
Hao et al.

(10) Patent No.: US 11,847,565 B1
(45) Date of Patent: Dec. 19, 2023

(54) AUTOMATIC REFINEMENT OF INTENT CLASSIFICATION FOR VIRTUAL ASSISTANT APPLICATIONS

(71) Applicant: FMR LLC, Boston, MA (US)

(72) Inventors: Hua Hao, Dalian (CN); Tieyi Guo, Frisco, TX (US); Byung Chun, Kingston, MA (US); Yachao He, Dalian (CN); Ou Li, Dalian (CN); Chao Yu, Dalian (CN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/109,373

(22) Filed: Feb. 14, 2023

(51) Int. Cl.
*G06N 3/08* (2023.01)
*G06F 16/35* (2019.01)
*G06F 16/901* (2019.01)

(52) U.S. Cl.
CPC ............ *G06N 3/08* (2013.01); *G06F 16/353* (2019.01); *G06F 16/9024* (2019.01)

(58) Field of Classification Search
CPC .......... G10L 15/16; G06N 20/20; G06N 3/08; G06F 16/3329; G06F 40/30; G06F 40/40; G06F 16/353; G06F 16/9024
See application file for complete search history.

(56) References Cited

U.S. PATENT DOCUMENTS 10,664,527 B1   5/2020   Henderson et al.
10,839,161 B2   11/2020  Galitsky
11,182,557 B2   11/2021  Mallinar et al.
11,184,298 B2   11/2021  Freed et al.
11,210,306 B2   12/2021  Steedman Henderson et al.
(Continued)

FOREIGN PATENT DOCUMENTS

WO    2021030449 A1    2/2021

OTHER PUBLICATIONS

Xu, Weiqun et al., "Bridging the Gap Between Dialogue Management and Dialogue Models," Proceedings of the Third SIGdial Workshop on Discourse and Dialogue, Philadelphia, Jul. 2002, pp. 201-210. (Year: 2002).*

(Continued)

*Primary Examiner* — Miranda M Huang
*Assistant Examiner* — Yao David Huang
(74) *Attorney, Agent, or Firm* — Cesari & McKenna, LLP

(57) ABSTRACT

Methods and apparatuses are described for automatic refinement of intent classification for virtual assistant applications. A computing device creates utterance groups comprising messages. The device determines, using a first machine learning (ML) classifier, a first predicted intent associated with each utterance group and determines, using a second ML classifier, a second predicted intent associated with each utterance group. The device combines the first and second predicted intents to generate a final predicted intent, determines, for each incomprehensible utterance group, whether the final predicted intent overlaps with the final predicted intent for other utterance groups, and selects messages having no overlapping intent to create new intents. The device determines, for each comprehensible utterance group, whether the final predicted intent overlaps with a preassigned intent for other utterance groups and combines the messages that have an overlapping intent to create and label a new utterance group with the overlapping intent.

18 Claims, 8 Drawing Sheets

(56) References Cited

U.S. PATENT DOCUMENTS

| | | | |
|---|---|---|---|
| 11,232,156 | B1 | 1/2022 | Wang et al. |
| 11,271,876 | B2 | 3/2022 | Yoon et al. |
| 11,558,509 | B1* | 1/2023 | Jayapalan ............ H04M 3/5175 |
| 2018/0006977 | A1* | 1/2018 | Nandi .................... G06Q 10/107 |
| 2020/0050667 | A1* | 2/2020 | Lin .......................... G06F 16/35 |
| 2020/0193094 | A1 | 6/2020 | Topol |
| 2020/0250270 | A1* | 8/2020 | Yu .......................... G06F 40/126 |
| 2020/0380964 | A1 | 12/2020 | Kang et al. |
| 2021/0157990 | A1 | 5/2021 | Lima et al. |
| 2021/0158127 | A1* | 5/2021 | Ren .......................... G06F 17/16 |
| 2021/0256417 | A1 | 8/2021 | Kneller et al. |
| 2021/0303798 | A1 | 9/2021 | Duong et al. |
| 2021/0334623 | A1* | 10/2021 | De Haan ................ G06N 3/045 |
| 2021/0374353 | A1 | 12/2021 | Zhang et al. |
| 2021/0390951 | A1* | 12/2021 | Gadde ................... G10L 15/063 |
| 2022/0051665 | A1* | 2/2022 | Bade ........................ G06N 7/01 |
| 2022/0067101 | A1 | 3/2022 | Appel et al. |

OTHER PUBLICATIONS

Pu, Jiashu et al., "Dialog Intent Induction via Density-based Deep Clustering Ensemble," arXiv: 2201.06731v1 [cs.CL] Jan. 18, 2022 (Year: 2022).*

Wang, Kunze et al., "Graph Neural Networks for Text Classification: A Survey," arXiv:2304.11534v2 [cs.CL] Apr. 27, 2023 (Year: 2023).*

Y. Wu et al., "Google's Neural Machine Translation System: Bridging the Gap between Human and Machine Translation," arXiv:1609.08144v2 [cs.CL] Oct. 8, 2016, available at https://arxiv.org/pdf/1609.08144.pdf, 23 pages.

J. Devlin et al., "BERT: Pre-training of Deep Bidirectional Transformers for Language Understanding," Proceedings of the 2019 Conference of the North American Chapter of the Association for Computational Linguistics: Human Language Technologies, vol. 1 (Long and Short Papers), pp. 4171-4186, Minneapolis, Minnesota.

A. Vaswani et al., "Attention is all you need," 31st Conference on Neural Information Processing Systems (NIPS 2017), Long Beach, CA, USA, arXiv:1706.03762v5 [cs.CL] Dec. 6, 2017, available at https://arxiv.org/pdf/1706.03762, 15 pages.

K. Thekumparampil et al., "Attention-based graph neural network for semi-supervised learning," arXiv:1803.03735 [stat.ML] Mar. 10, 2018, available at https//arxiv.org/pdf/1803.03735.pdf, 15 pages.

Z. Hu et al, "Heterogeneous Graph Transformer," arXiv:2003.01332v1 [cs.LG] Mar. 3, 2020, available at https://arxiv.org/pdf/2003.01332.pdf, 11 pages.

A. Radford et al., "Improving Language Understanding by Generative Pre-Training," OpenAI, Jun. 11, 2018, available at https://cdn.openai.com/research-covers/language-unsupervised/language_understanding_paper.pdf, 12 pages.

J. Zhou et al., "Graph neural networks: A review of methods and applications," AI Open, vol. 1 (2020), available online Apr. 8, 2021, pp. 57-81.

M. Peters et al., "Deep contextualized word representations," arXiv:1802.05365v2 [cs.CL] Mar. 22, 2018, available at https://arxiv.org/pdf/1802.05365.pdf, 15 pages.

D. Vrabac and V. Krishna, "CheXGB: Combining Graph Neural Networks and BERT for automated radiology report labeling," Stanford CS224N Custom Project, available at https://web.stanford.edu/class/archive/cs/cs224n/cs224n.1214/reports/final_reports/report054.pdf, Winter 2021, 9 pages.

Y. Yang and X. Cui, "Bert-Enhanced Text Graph Neural Network for Classification," Entropy 2021, 23, 1536, https://doi.org/10.3390/e23111536, Nov. 18, 2021, 13 pages.

* cited by examiner

FIG. 3

*Utterance Group 1 (VIP Access Intent)*

*Utterance Group 1 (Account Balance Intent)*

AUTOMATIC REFINEMENT OF INTENT CLASSIFICATION FOR VIRTUAL ASSISTANT APPLICATIONS

TECHNICAL FIELD

This application relates generally to methods and apparatuses, including computer program products, for automatic refinement of intent classification for virtual assistant applications.

BACKGROUND

A virtual assistant application (also called a chatbot) is a computer software application and/or computing system that communicates with users at client computing devices through an exchange of text messages and/or audio messages during conversations. Virtual assistants are commonly used in different areas of daily life with high efficiency and low costs, such as providing weather forecasts, giving business advice, and responding to queries. Generally, the technology behind a virtual assistant application comprises a Natural Language Understanding (NLU) and/or Natural Language Processing (NLP) algorithm that captures user input messages (also called utterances), parses the messages and attempts to discern the intent or reason for the user's messages. Certain types of virtual assistants are task-oriented, meaning that the virtual assistant receives a user message, recognizes one or more user intents and/or entities of the message, retrieves information that is related to or otherwise responsive to the message, and generates a response message that is provided to the user. In some cases, virtual assistant applications leverage advanced machine learning technology—such as intent recognition models—in order to comprehend the intent behind a user's message more accurately or efficiently. Generally, an intent recognition model attempts to map a user's message to a particular user intent that is defined in the virtual assistant, where the intent provides the virtual assistant with a starting point from which to respond to the user message.

Although a virtual assistant can be highly useful for business owners (e.g., by reducing or eliminating the need for live customer service staff, more quickly responding to user queries, etc.), sometimes the virtual assistant may be unable to determine the proper user intent or may determine an incorrect user intent because, e.g., the chatbot may be unable to parse or understand a particular message from an end user (a so-called unrecognized or incomprehensible message). For example, when a chatbot does not comprehend a user's message, the chatbot may simply respond with a default message such as "Sorry, I don't understand what you mean by that," continually asks the user to repeat the message or state the message in a different way, or the virtual assistant may provide a response to the user that includes irrelevant or incorrect information. As a result, some end users may stop interacting with virtual assistant systems due to experiencing these difficulties with the virtual assistant understanding the user's messages and providing unexpected or undesirable responses. Such activity leads to user dissatisfaction with the virtual assistant technology.

In order to avoid these problems, developers try to improve the virtual assistant application performance by re-training the underlying intent recognition model so that the model better understands the intent behind the requests/messages originating from end users. As can be appreciated, upon closer inspection, certain messages should actually be mapped to different user intents than they are currently, while other messages should be mapped to new user intents. When correct intent mappings are determined for user utterances, the data can be absorbed into the model training dataset to help re-train and improve the existing intent classifier model.

SUMMARY

Therefore, what is needed are methods and systems for automatically processing analyzing user messages via a multi-classification machine learning ensemble in order to determine when an intent is not found for an incomprehensible utterance group or when an overlap is detected between existing intents, while also supplying utterances that lead to these two situations. As a result, the processing performed by the methods and systems herein is very helpful for a designer of a virtual assistant to determine a new user intent or effectively to use existing intents to retrain the virtual assistant. The techniques described herein advantageously utilize a plurality of advanced machine learning classification algorithms, including transform classifiers and graph neural networks (GNNs) among others, to determine overlap between the intent for existing utterances and utterance groups and generate updated intent categories and assigned messages as training data that is then re-incorporated into, e.g., a natural language processing (NLP) and/or natural language understanding (NLU) model used by the virtual assistant application to conduct communication sessions with one or more end users.

The invention, in one aspect, features a computer system for automatic refinement of intent classification for virtual assistant applications. The system comprises a computing device having a memory that stores computer-executable instructions and a processor that executes the computer-executable instructions. The computing device creates a plurality of utterance groups each comprising one or more messages from a corpus of virtual assistant message logs. The computing device determines, using a first machine learning classifier, a first predicted intent associated with each utterance group using the messages in the utterance group as input to the first machine learning classifier. The computing device generates a graph data structure based upon the plurality of utterance groups, the graph data structure comprising a first plurality of intent category nodes, a second plurality of utterance group nodes, a third plurality of utterance nodes, and a fourth plurality of keyphrase nodes. The computing device determines, using a second machine learning classifier, a second predicted intent associated with each utterance group using the graph data structure as input to the second machine learning classifier. The computing device combines, for each utterance group, the first predicted intent for the utterance group and the second predicted intent for the utterance group to generate a final predicted intent for the utterance group. The computing device determines, for each utterance group generated from incomprehensible utterances, whether the final predicted intent for the utterance group overlaps with the final predicted intent for other utterance groups and selects one or more messages in the utterance group having no overlapping intent to create one or more new intents based on the selected messages. The computing device determines, for each utterance group generated from comprehensible utterances, whether the final predicted intent for the utterance group overlaps with a preassigned intent for other utterance groups and combines the messages in the utterance groups that have an overlapping intent to create a new utterance group and label the new utterance group with the overlapping intent.

The invention, in another aspect, features a computerized method of automatic refinement of intent classification for virtual assistant applications. A computing device creates a plurality of utterance groups each comprising one or more messages from a corpus of virtual assistant message logs. The computing device determines, using a first machine learning classifier, a first predicted intent associated with each utterance group using the messages in the utterance group as input to the first machine learning classifier. The computing device generates a graph data structure based upon the plurality of utterance groups, the graph data structure comprising a first plurality of intent category nodes, a second plurality of utterance group nodes, a third plurality of utterance nodes, and a fourth plurality of key-phrase nodes. The computing device determines, using a second machine learning classifier, a second predicted intent associated with each utterance group using the graph data structure as input to the second machine learning classifier. The computing device combines, for each utterance group, the first predicted intent for the utterance group and the second predicted intent for the utterance group to generate a final predicted intent for the utterance group. The computing device determines, for each utterance group generated from incomprehensible utterances, whether the final predicted intent for the utterance group overlaps with the final predicted intent for other utterance groups and selects one or more messages in the utterance group having no overlapping intent to create one or more new intents based on the selected messages. The computing device determines, for each utterance group generated from comprehensible utterances, whether the final predicted intent for the utterance group overlaps with a preassigned intent for other utterance groups and combines the messages in the utterance groups that have an overlapping intent to create a new utterance group and label the new utterance group with the overlapping intent.

Any of the above aspects can include one or more of the following features. In some embodiments, creating a plurality of utterance groups each comprising one or more messages from a corpus of virtual assistant message logs comprises determining a subset of messages from the corpus of virtual assistant message logs that are associated with an existing intent classification, and assigning the subset of messages to an utterance group. In some embodiments, determining a first predicted intent associated with each utterance group using the messages in the utterance group as input to the first machine learning classifier comprises generating a multidimensional embedding for each message in the utterance group, the embedding based upon one or more of token embedding, segment embedding, and positional embedding; classifying the multidimensional embedding using the first machine learning classifier to assign a predicted intent to the corresponding message; and determining the first predicted intent associated with the utterance group based upon the predicted intent assigned to each message in the utterance group. In some embodiments, the first machine learning classifier is a Bidirectional Encoder Representation from Transformers (BERT) classifier.

In some embodiments, generating a graph data structure based upon the plurality of utterance groups comprises determining a plurality of intent categories associated with the corpus of virtual assistant message logs and generating the first plurality of intent category nodes based upon the intent categories; generating the second plurality of utterance group nodes based upon the plurality of utterance groups; generating the third plurality of utterance nodes based upon the messages in each utterance group; and selecting, for each intent category, a plurality of key-phrases from the corpus of virtual assistant message logs associated with the intent category and generating the fourth plurality of key-phrase nodes based upon the key-phrases. In some embodiments, each node in the first plurality of intent category nodes is connected to one or more nodes in the second plurality of utterance group nodes; each node in the second plurality of utterance group nodes is connected to one or more nodes in the third plurality of utterance nodes; and one or more nodes in the third plurality of utterance nodes is connected to a key-phrase node. In some embodiments, selecting a plurality of key-phrases from the corpus of virtual assistant message logs associated with the intent category comprises: executing a term frequency-inverse document frequency (TF-IDF) algorithm on the corpus of virtual assistant message logs associated with the intent category to identify a plurality of key-phrases; and selecting the identified key-phrases from the corpus of virtual assistant message logs associated with the intent category.

In some embodiments, determining a second predicted intent associated with each utterance group using the graph data structure as input to the second machine learning classifier comprises: generating a multidimensional embedding for each node in the graph data structure; classifying the multidimensional embedding using the second machine learning classifier to assign a predicted intent to each utterance group node in the graph data structure; and determining the second predicted intent associated with the utterance group based upon the predicted intent assigned to the corresponding utterance group node. In some embodiments, the second machine learning classifier is a graph neural network (GNN) classifier.

In some embodiments, combining the first predicted intent for the utterance group and the second predicted intent for the utterance group to generate a final predicted intent for the utterance group comprises: assigning the first predicted intent to the utterance group as the final predicted intent, when the first machine learning classifier is able to generate the first predicted intent; and assigning the second predicted intent to the utterance group as the final predicted intent, when the first machine learning classifier is unable to generate the first predicted intent. In some embodiments, the computing device retrains a virtual assistant application to identify an intent of one or more incoming messages based upon the new utterance group.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a diagram of two exemplary utterance groups as generated by message grouping module.

DETAILED DESCRIPTION

Figure 1:
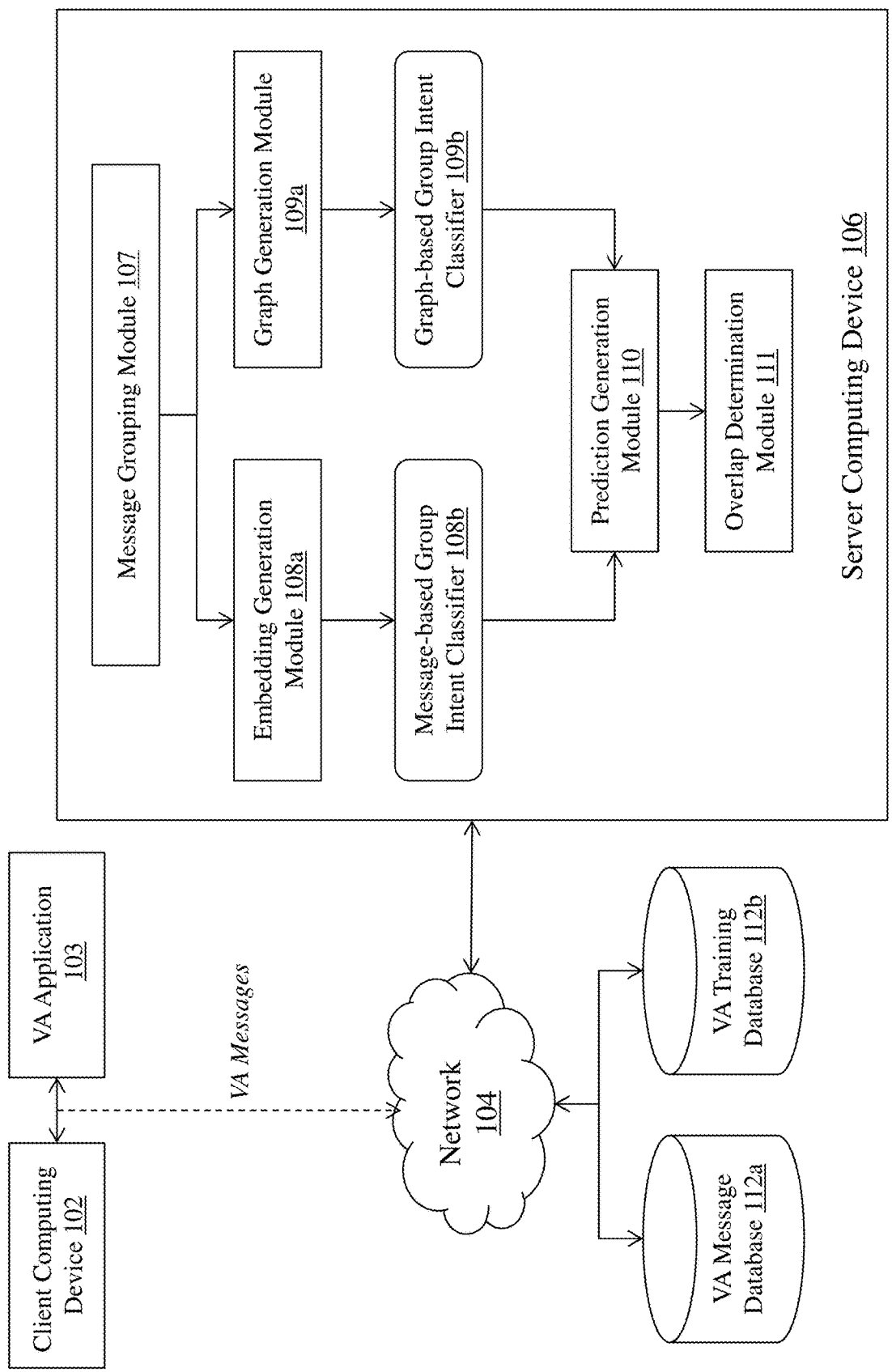
FIG. 1 is a block diagram of a system for automatic refinement of intent classification for virtual assistant applications.

FIG. 1 is a block diagram of a system 100 for automatic refinement of intent classification for virtual assistant applications. System 100 includes client computing device 102, virtual assistant (VA) application 103, communication network 104, server computing device 106 that includes message grouping module 107, embedding generation module 108a, message-based group intent classifier 108b, graph generation module 109a, graph-based group intent classifier 109b, prediction generation module 110, and overlap determination module 111. System further includes VA message database 112a and VA training database 112b.

Client computing device 102 connects to communications network 104 in order to establish a chat-based or voice-based communication session with VA application 103. Client computing device 102 can be coupled to a display device (not shown), such as a monitor, display panel, or screen. For example, client computing device 102 can provide a graphical user interface (GUI) via the display device to a user of the corresponding device that presents output resulting from the methods and systems described herein and receives input from the user for further processing. Exemplary client computing devices 102 include but are not limited to desktop computers, laptop computers, tablets, mobile devices, smartphones, smart watches, Internet-of-Things (IoT) devices, and internet appliances. It should be appreciated that other types of client computing devices that are capable of connecting to the components of the system 100 can be used without departing from the scope of invention. Although FIG. 1 depicts a single client computing device 102, it should be appreciated that system 100 can include any number of client computing devices.

VA application 103 (also referred to as a chatbot) comprises an automated conversation service software application executing on a computing device (such as a server computing device) and being configured to automatically interact with a user at client computing device 102 in order to exchange audio or text messages for gathering information and/or responding to inquiries. An exemplary conversation service application can be based upon a natural language processing (NLP) architecture which intelligently parses text or voice messages received from client computing device 102 to understand the semantics and context of the message. VA messages exchanged between client computing device 102 and VA application 103 are stored in VA messages database 112a.

Communication network 104 enables VA messages to be captured from a communication session between client computing device 102 and VA application 103 for storage and processing as described herein. In addition, communication network 104 enables server computing device 106 to communicate with databases 112a and 112b, and one or more other remote computing devices (not shown). In some embodiments, client computing device 102 is similarly connected to network 104 in order to communicate with server computing device 106. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on a processor and interact with memory modules of server computing device 106, to receive data from other components of system 100, transmit data to other components of system 100, and perform functions for automatic refinement of intent classification for virtual assistant applications as described herein. Server computing device 106 includes several computing modules and classifiers (collectively, 107, 108a-108b, 109a-109b, 110, and 111) that execute on one or more processors of server computing device 106. In some embodiments, modules 107, 108a, 109a, 110 and 111 and classifiers 108b and 109b are specialized sets of computer software instructions programmed onto one or more dedicated processors in server computing device 106 and can include specifically-designated memory locations and/or registers for executing the specialized computer software instructions.

Although modules 107, 108a, 109a, 110 and 111 and classifiers 108b and 109b are shown in FIG. 1 as executing within the same server computing device 106, in some embodiments the functionality of modules 107, 108a, 109a, 110 and 111 and classifiers 108b and 109b can be distributed among a plurality of server computing devices. As shown in FIG. 1, server computing device 106 enables modules 107, 108a, 109a, 110 and 111 and classifiers 108b and 109b to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 107, 108a, 109a, 110 and 111 and classifiers 108b and 109b is described in detail below.

VA message database 112a and VA training database 112b are located on a single computing device (or in some embodiments, on a plurality of computing devices) coupled to client computing device 102 and/or VA application 103, and to server computing device 106, and are configured to receive, generate, transmit, and store specific segments of data relating to the process of automatic refinement of intent classification for virtual assistant applications as described herein. In some embodiments, all or a portion of databases 112a and 112b can be integrated with server computing device 106 or be located on a separate computing device or devices. Databases 112a and 112b can be configured to store portions of data used by the other components of the system 100, as will be described in greater detail below. In some embodiments, databases 112a and 112b are located in a cloud storage infrastructure comprising one or more nodes accessible by server computing device 106. Specific aspects of the functions performed by databases 112*a* and 112*b*, and the data contained therein, are described throughout the specification.

Generally, system 100 receives a corpus of VA messages (i.e., user utterances) from, e.g., database 112*a*, groups the utterances into a plurality of groups using message grouping module 107, and applies two different machine learning methodologies to the grouped utterances to predict user intent. The first methodology is based upon generating a plurality of multidimensional embeddings based upon the utterances in each group using embedding generation module 108*a* and executing message-based group intent classifier 108*b* with the embeddings as input to determine a first user intent for the utterances in the group. The second methodology is based upon generating a graph data structure for each group using graph generation module 109*a*, and executing graph-based group intent classifier 109*b* with the graph data structure as input to determine a second user intent for the utterances in the group. Once the first user intent and the second user intent are determined, prediction generation module 110 combines the user intents and for each group, overlap determination module 111 determines intent overlap between the groups. When a user intent overlaps between two or more groups, module 111 combines the utterances in each group to create a new utterance group and labels the utterance group with the overlapping intent. This data can then be used to, e.g., retrain VA application 103 to increase accuracy of user intent determination.

Figure 2:
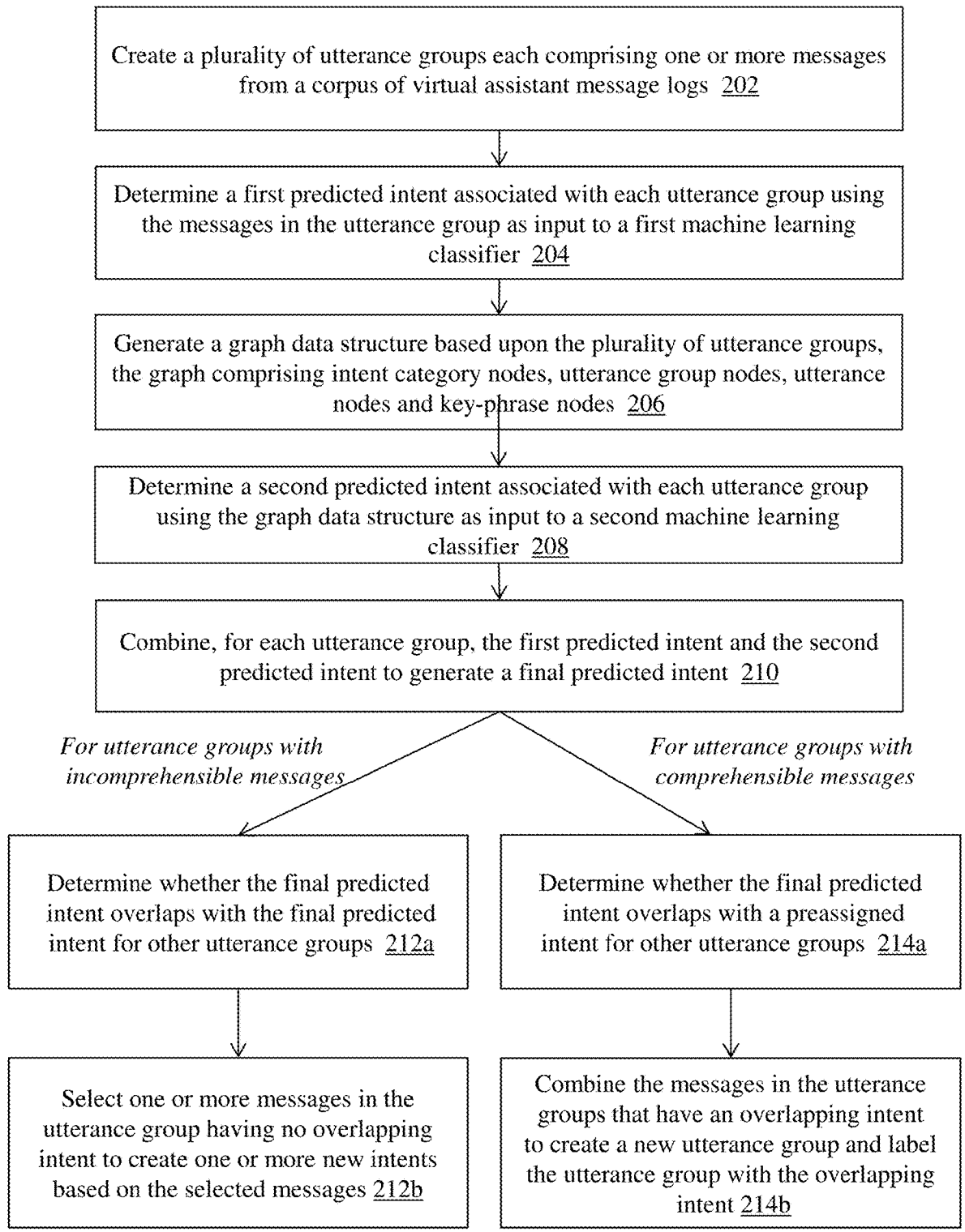
FIG. 2 is a flow diagram of a computerized method of automatic refinement of intent classification for virtual assistant applications.

FIG. 2 is a flow diagram of a computerized method 200 of automatic refinement of intent classification for virtual assistant applications, using system 100 of FIG. 1. As mentioned above, VA message database 112*a* captures message exchanges between a user of client computing device 102 and VA application 103 during a communication session. VA message database 112*a* can be configured to capture message exchanges in real-time and/or collect messages asynchronously—for example, at the conclusion of a communication session, VA message database 112*a* can receive message logs from VA application 103 and store the message logs. In some embodiments, the message logs comprise structured or unstructured data (e.g., text files, XML files) that includes the messages exchanged between the user at client computing device 102 and VA application 103. As can be appreciated, the messages comprise utterances provided by the user and responses provided by VA application 103. In some embodiments, due to privacy concerns, VA application 103 is configured to not collect or store confidential or personally-identifiable information that is exchanged during the communication session—in these embodiments, VA application 103 can redact the sensitive information prior to generating the logs.

As mentioned above, during a communication session with client computing device 102, VA application 103 receives user utterances and parses each user utterance in order to understand the user's intent relating to the utterance and develop an appropriate response to the utterance. Typically, VA application 103 utilizes a trained NLP model and/or trained NLU model to automatically determine user intent. These models are trained on historical communication session data and corresponding user intents assigned by, e.g. analysts to predict user intent for an incoming utterance. As can be appreciated, over time the trained NLP/NLU models need to be periodically re-trained to maintain accuracy and consistency of intent predictions, particularly when the models encounter new utterances or unrecognizable utterances. In this context, a comprehensible (or recognizable) utterance is a user message that the chatbot is able to map to one or more existing user intents while an incomprehensible (or unrecognizable) utterance is a user message that the chatbot cannot map to any existing user intents. Advantageously, as described herein, the modules and classifiers of server computing device 106 leverage user utterances and determined user intents from communication sessions to automatically refine the predicted user intent. The modules and classifiers of server computing device 106 employ advanced machine learning techniques and ensemble classification to determine overlap between user intent for utterances, which enables system 100 to adjust the predicted user intent for an utterance or group of utterances to better align with the most likely (or actual) user intent. By storing the adjusted user intents and related data in VA training database 112*b*, system 100 can re-train the NLP/NLU model(s) used by VA application 103 to seamlessly improve the accuracy and robustness of VA application 103, thereby providing a more consistent and higher-quality user experience.

Turning back to FIG. 2, message grouping module 107 retrieves one or more message logs from VA message database 112*a*, where the message logs comprise a plurality of user utterances from communication sessions with VA application 103. The message logs also include the predicted user intent for each utterance as determined by VA application 103 during the communication session. Message grouping module 107 creates (step 202) a plurality of utterance groups from the user utterances and determined intents. Each utterance group includes one or more of the user utterances. In some embodiments, module 107 creates the utterance groups by creating a group for each predicted user intent and assigning the utterances that were labeled with that intent by VA application 103 to the corresponding group. For example, module 107 can sample a predetermined number (e.g., 10, 20) of user utterances with replacement from all of the utterances that are labeled with the same intent category and create an utterance group with the selected utterances. Other selection methods could also be used, such as building utterance groups through extracting utterances after clustering the utterances based upon one or more similarity metrics (e.g., K-means clustering) or using clusters as utterance groups directly. FIG. 3 is a diagram of two exemplary utterance groups as generated by message grouping module 107. As shown in FIG. 3, the utterances in Group 1 relate to the user intent "Account Balance" and the utterances in Group 2 relate to the user intent "VIP Access."

After creation of the utterance groups, server computing device 106 processes the utterance groups by applying a plurality of different machine learning methodologies to the utterance groups. Each machine learning methodology produces a predicted user intent, and server computing device 106 uses an ensemble classification approach to combine the respective predictions into a final user intent for a particular utterance group. In some embodiments, the machine learning methodologies can be applied in parallel by server computing device 106 in order to improve processing speed and efficiency.

Message-Based Intent Prediction

The first machine learning methodology comprises determining (step 204) a first predicted user intent associated with each utterance group using the messages in the utterance group as input to a first machine learning classifier by, e.g., generating a multidimensional embedding for each message in the utterance group and executing a machine learning classifier using the embeddings as input to determine the first predicted user intent. Embedding generation module 108*a* of server computing device 106 receives the utterance groups and associated messages from message grouping module 107. In some embodiments, message grouping module 108a first tokenizes each utterance in the group, i.e., partitioning the utterance string into a plurality of tokens, before sending the tokens to module 108a. As can be appreciated, each token corresponds to a word in the utterance. In some embodiments, the tokenization process includes the removal from the utterance of stopwords, punctuation, and similar elements that are not relevant to an intent determination. An exemplary tokenization algorithm that can be used by module 107 is Wordpiece, as described in Y. Wu et al., "Google's Neural Machine Translation System: Bridging the Gap between Human and Machine Translation," arXiv:1609.08144v2 [cs.CL] 8 Oct. 2016, available at arxiv.org/pdf/1609.08144.pdf, which is incorporated herein by reference.

For each utterance group, embedding generation module 108a converts the corresponding tokens for the user messages in the group into multidimensional embeddings (e.g., 768 dimensions) that can be analyzed by message-based group intent classifier 108b to determine user intent. In some embodiments, embedding generation module 108a and message-based group intent classifier 108b can comprise one or more layers of the same machine learning model. An exemplary model used by modules 108a and 108b can be a pretrained language model such as BERT (Bidirectional Encoder Representations from Transformers), as described in J. Devlin et al., "BERT: Pre-training of Deep Bidirectional Transformers for Language Understanding," *Proceedings of the* 2019 *Conference of the North American Chapter of the Association for Computational Linguistics: Human Language Technologies, Volume* 1 (*Long and Short Papers*), pages 4171-4186, Minneapolis, Minnesota. Association for Computational Linguistics (incorporated herein by reference)). BERT is based upon a Transformer model (as described in A. Vaswani et al., "Attention is all you need," 31$^{st}$ *Conference on Neural Information Processing Systems* (NIPS 2017), Long Beach, CA, USA, arXiv:1706.03762v5 [cs.CL] 6 Dec. 2017, available at arxiv.org/pdf/1706.03762, which is incorporated herein by reference). In an exemplary embodiment of modules 108a and 108b, the BERT model is a fine-tuned BERT classifier comprising 12 layers of Transformer blocks with hidden size of 768 and 12 self-attention heads, and 2 dense layers with tanh (hyperbolic tangent) activation and 1 dropout.

In this example, embedding generation module 108a comprises the embedding layer(s) of the BERT model—which can include a token embedding layer, a segment embedding layer, and a position embedding layer. Generally, the token embedding layer converts each token into a multi-dimensional vector representation of the token—such that the input tokens for a given utterance are converted into a matrix or tensor. The segment embedding layer generates a vector representation for the utterance that is used to distinguish between paired input utterances. The position embeddings layer generates a vector representation for each token based upon the token's position in the utterance. Module 108a sums the vector representations from each of the embedding layers to products a single representation for the utterance that is used by subsequent encoder layers of the BERT model. Additional detail about the embedding layers of the BERT model is described in Devlin, supra.

Figure 4:
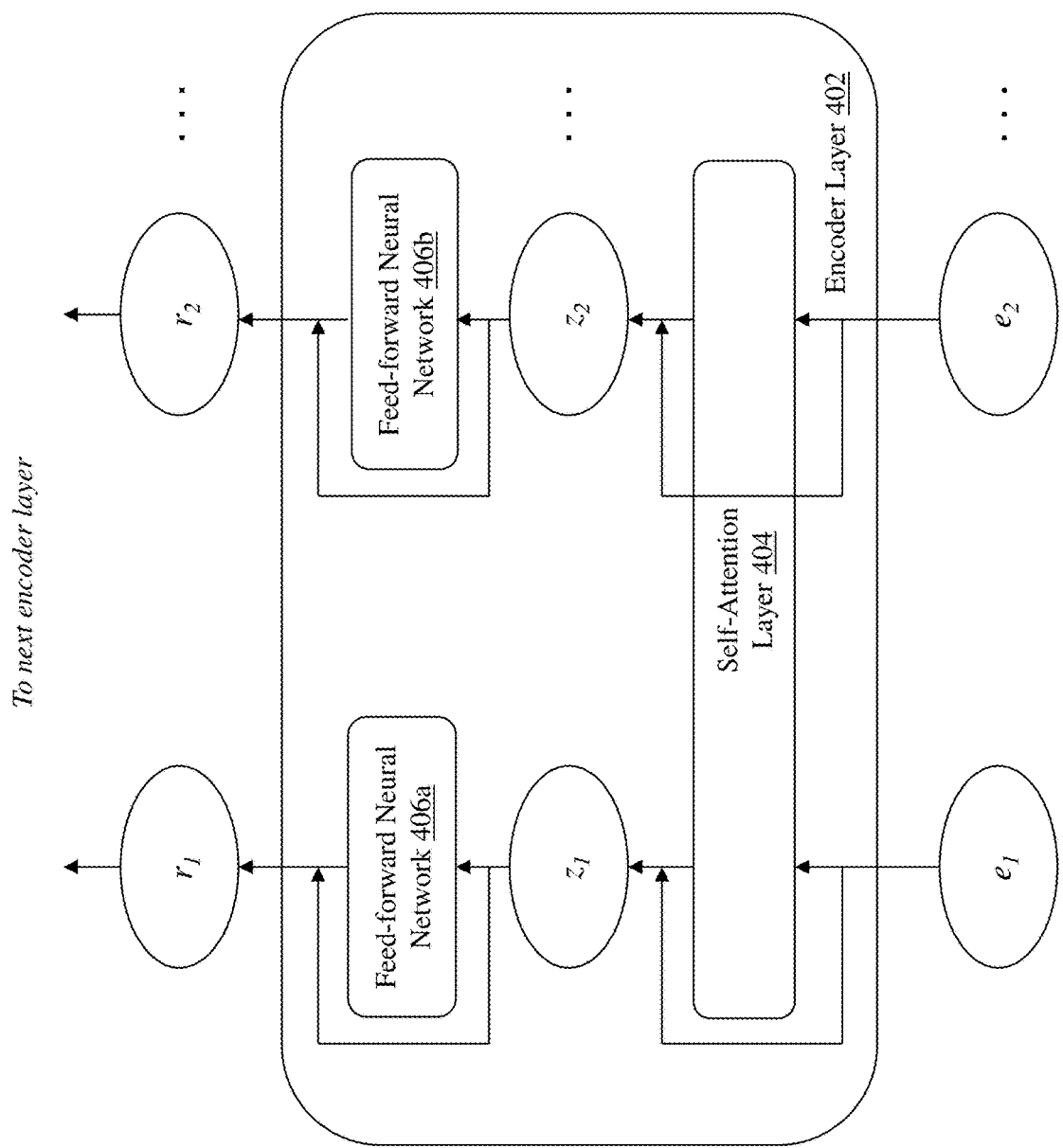
FIG. 4 is a diagram of an exemplary encoder layer of the message-based group intent classifier.
Figure 5:
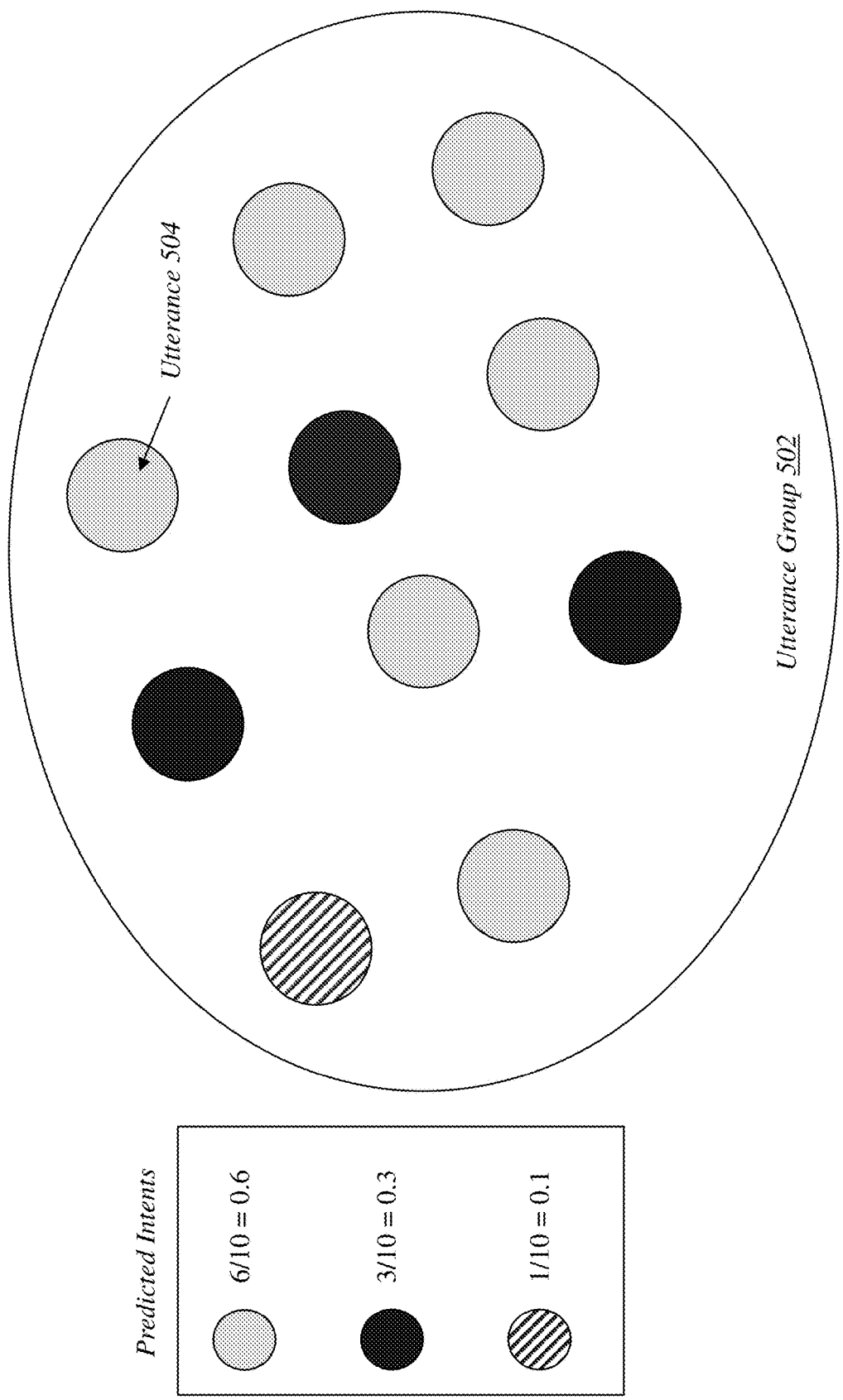
FIG. 5 is a diagram of an exemplary statistical analysis performed by the message-based group intent classifier to determine the first predicted user intent for the utterance group.

Once the input embedding for each utterance in the utterance group is generated by module 108a, the input embeddings are received by message-based group intent classifier 108b to determine a user intent associated with each utterance. In some embodiments, classifier 108b comprises the encoder layer(s) of the BERT model, which comprises a stack of six identical layers each with two sub-layers: a multihead self-attention sub-layer and a feed-forward neural network sub-layer. FIG. 4 is a diagram of an exemplary encoder layer of the classifier 108b. As shown in FIG. 4, $e_1$, $e_2$, . . . are input embeddings of each token as generated by module 108a. Input embeddings are processed through self-attention layer 404 to produce corresponding output $z_1$, $z_2$, . . . (the weighted sum representation of the input token's embedding) based on the following equation:

$$\text{Attention}(Q, K, V) = \text{softmax}\left(\frac{QK^T}{\sqrt{d_k}}\right)V$$

where Q, K, V are calculated by $E \times W^Q$, $E \times W^K$, $E \times W^V$ respectively, $E = \{e_1, e_2, \ldots\}$ is the set of embeddings of all the input tokens, $W^Q$, $W^K$, $W^V$ is the weight matrix that is learned during model training, $Q \times K^T$ measures, for each token, when that token is being paid attention to, whether other tokens should be paid more attention or less attention. And, the softmax function projects the measurements to the values from 0 to 1 as the attention weights. The output $z_1$, $z_2$, . . . for each token is fed into a feed-forward neural network (FFN) (e.g., 406a, 406b) which produces output $r_1$, $r_2$, . . . , calculated based on the following equation:

$$\text{FFN}(x) = \max(0, xW_1 + b_1)W_2 + b_2$$

comprising two linear transformations (xW+b) with a ReLU activation (max (0,*)) in between, which adds a non-linear transformation to enhance the model's representation capability. Output $r_1$, $r_2$, . . . is provided to the next embedding layer in the stack (not shown) and the same processing occurs in each embedding layer in module 108b. The final output of message-based group intent classifier 108b comprises a predicted intent (or predicted intent category) for each utterance in the given utterance group. Once the predicted intent for each utterance in the group is determined, classifier 108b can determine a first predicted intent for the utterance group collectively through analysis of the predicted intent for each utterance. In some embodiments, classifier 108b performs a statistical analysis of the predicted intents to generate the first predicted user intent for the overall group. FIG. 5 is a diagram of an exemplary statistical analysis performed by classifier 108b to determine the first predicted user intent for the utterance group. As shown in FIG. 5, classifier 108b determines a percentage of utterances (e.g., utterance 504) in the group 502 that are assigned a predicted intent (or predicted intent category)— shown as different shading in FIG. 5. Based on the percentage for each predicted intent, classifier 108b determines the first predicted intent by selecting the intent with the percentage of utterances that exceeds a predetermined threshold value (e.g., 0.5). Because the percentage of utterances associated with a particular intent ('light gray') is 0.6, classifier 108b determines that this intent should be assigned to the utterance group. It should be appreciated that other types of analyses can be performed by classifier 108b in order to determine an overall user intent for the utterance group. This first predicted user intent for the utterance group is stored by server computing device 106 for later use in determining the final predicted user intent for the utterance group.

Graph-Based Intent Prediction

The second machine learning methodology used by server computing device 106 to determine intent for an utterance group comprises generating (step 206) a graph data structure based upon the plurality of utterance groups using graph generation module 109a, and determining (step 208) a second predicted user intent associated with each utterance group using the graph data structure as input to a second machine learning classifier (i.e., graph-based group intent classifier 109b). In some embodiments, classifier 109b comprises a Heterogeneous Graph Transformer (HGT) model that receives the graph data structure as input and determines a second predicted user intent for each utterance group in the graph structure.

In this context, a graph data structure comprises a plurality of nodes—where each node corresponds to an entity—along with a plurality of edges that connect the nodes and define a relationship between the entities. As can be appreciated, there are generally two types of graph data structures: homogeneous graphs and heterogeneous graphs. In a homogeneous graph, all the nodes represent instances of the same entity type and all the edges represent relations of the same type, such as a social network which consists of people (nodes) and their connections (edges). In this example, each 'person' node is connected to other 'person' nodes via an 'is connected to' relationship edge.

Figure 6:
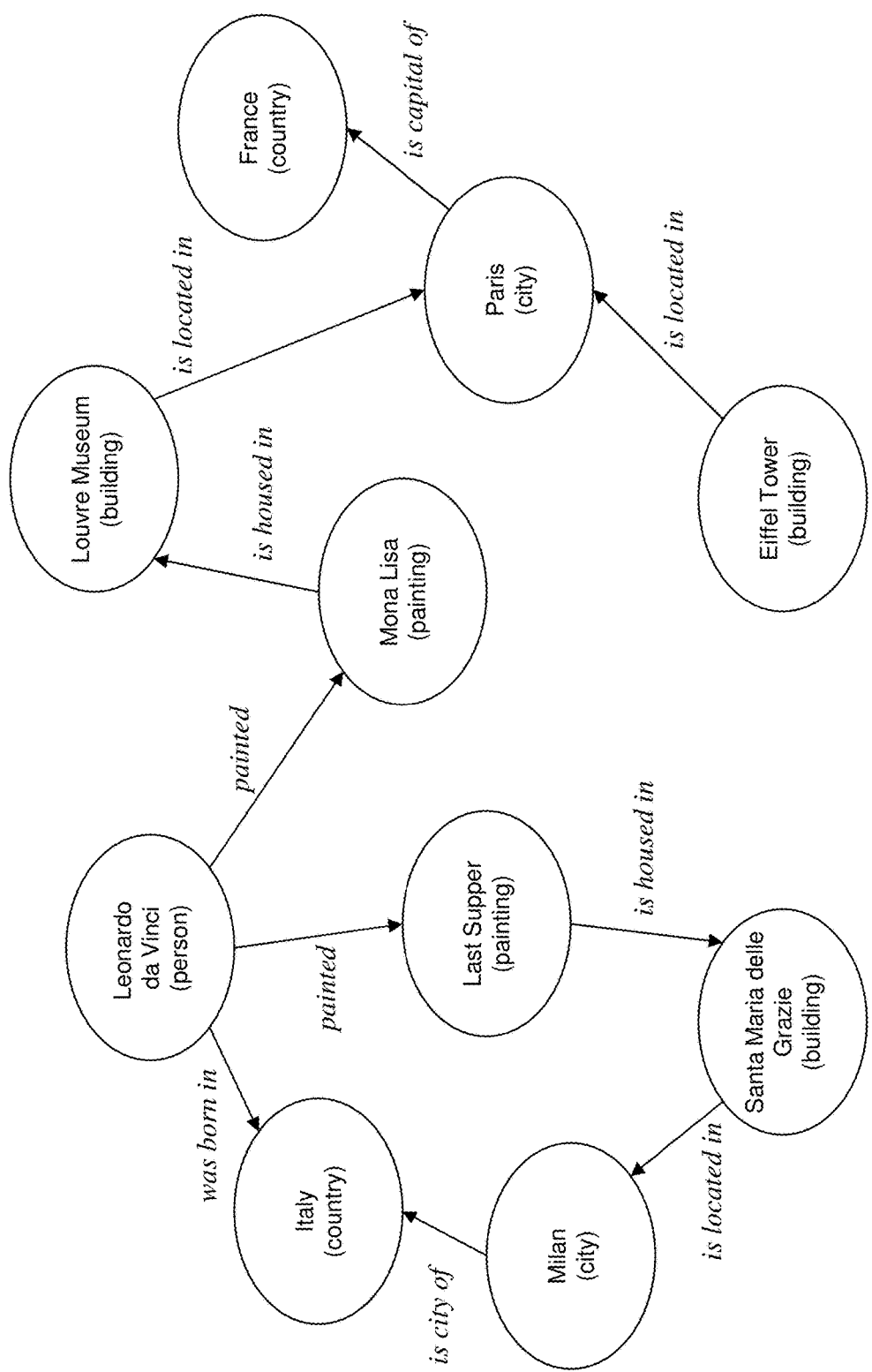
FIG. 6 is a diagram of an exemplary heterogeneous graph.

In a heterogeneous graph, the nodes and edges can be of different types. For example, the nodes in a heterogeneous graph may comprise five different types: person, country, city, painting, and building, with different types of relations linking nodes together—e.g., a person node may be connected to a city node via a 'was born in' relationship edge, while a building node may also be connected to a city node via a 'is located in' relationship edge. An exemplary heterogeneous graph is shown in FIG. 6. Module 109a generates heterogeneous graph data structures based upon the utterance groups and related information collected from the VA application as described below.

Figure 7:
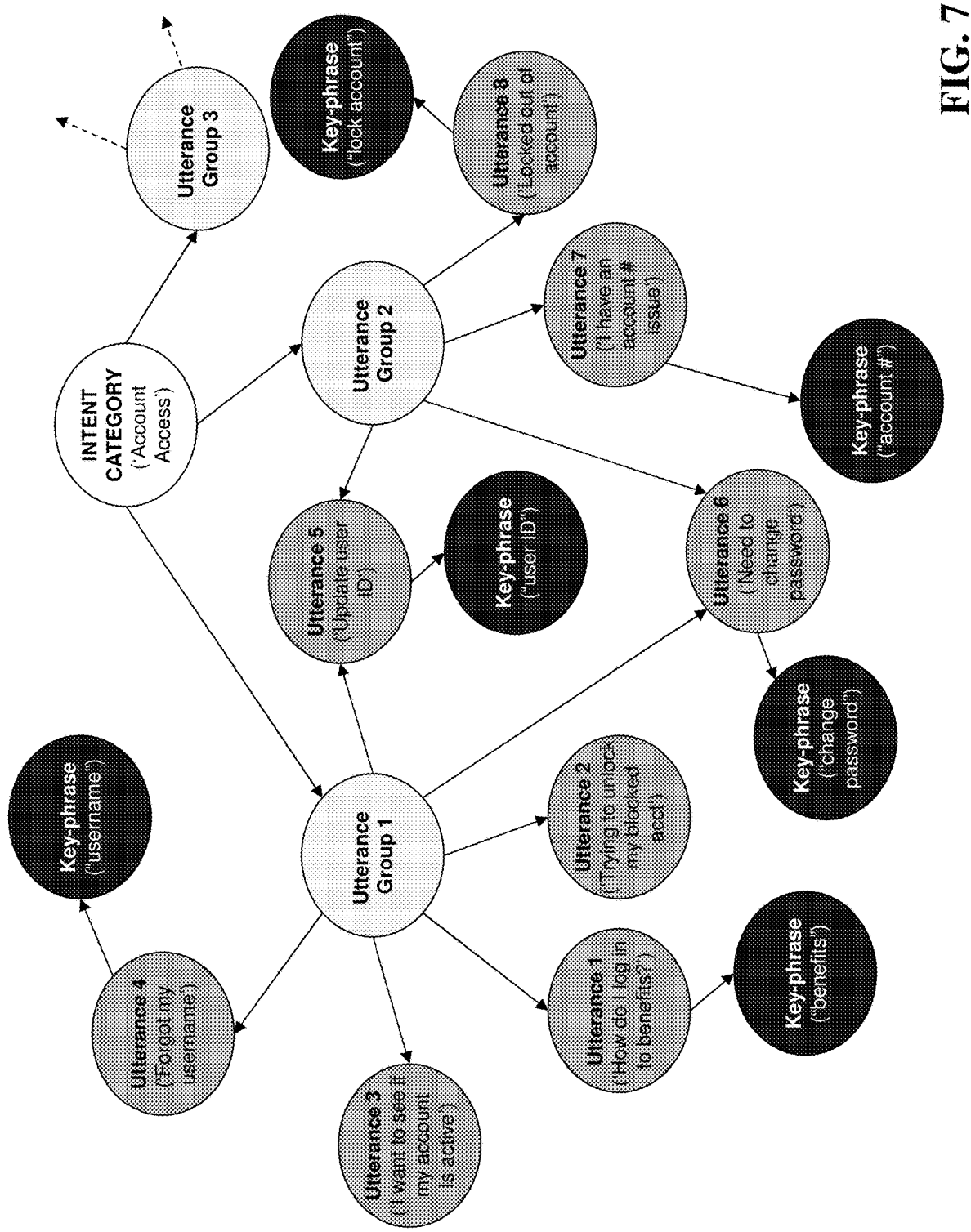
FIG. 7 is a diagram of an exemplary graph structure generated by graph generation module for an 'Account Access' intent category.

To build the graph data structure based upon the communication session data captured from VA application 103, graph generation module 109a performs steps to create several different types of nodes: a first plurality of intent category nodes, a second plurality of utterance group nodes, a third plurality of utterance nodes, and a fourth plurality of key-phrase nodes. Module 109a can generate the first plurality of intent category nodes based upon the labeled intents from VA application 103. Each node of the first plurality of intent category nodes corresponds to a single intent category. For example, an intent category may be 'Account Access.' Module 109a can generate the second plurality of utterance group nodes using the utterance groups generated by message grouping module 107 as described previously. Module 109a can generate the third plurality of utterance nodes using the utterances in each of the associated utterance groups. Module 109a can generate the fourth plurality of key-phrase nodes by determining key-phrases or keywords in the messages that correspond to the 'Account Access' intent category using a term frequency-inverse document frequency (TF-IDF) with n_gram=[2, 3]. FIG. 7 is a diagram of an exemplary graph structure generated by graph generation module 109a for an 'Account Access' intent category. As shown in FIG. 7, the graph data structure comprises a plurality of different types of nodes (INTENT CATEGORY, Utterance Group, Utterance, Key-phrase) that correspond to the utterance groups and messages generated previously, and the nodes are connected via edges denoting a relationship between the nodes.

Once the graph data structure is created, graph-based group intent classifier 109b determines (step 208) a second predicted intent associated with each utterance group using the graph data structure as input. As mentioned above, classifier 109b comprises a Heterogeneous Graph Transformer (HGT) model. As can be appreciated, the HGT model is based upon the use of Graph Neural Networks (GNNs). GNNs have attracted increasing attention in recent years, as there are many real-world situations and tasks (e.g. social networks, knowledge graphs, biological networks, etc.) that comprise data generated from non-Euclidean domains and are represented as graphs with complex relationships—such as the graph data structure shown in FIG. 7. Traditional deep learning methods cannot handle these data structures, but GNNs are designed to process the graph structure data.

Generally, a GNN uses the input graph data structure as the computation graph for message passing, during which the local neighborhood information is aggregated to get a more contextual representation. Essentially, a GNN layer calculates the nodes' representation which integrates neighbor nodes' information, then several GNN layers are stacked to determine node representations of the whole graph; this process is called message passing. The more GNN layers that are stacked, the deeper the neighbor nodes' information that is used.

As illustrated in the equation below, for the (l)th GNN layer, the representation of target node t is calculated with its representation in the (l−1)th layer and neighbor information from source nodes of the (l−1)th layer, $$H^l[t] \leftarrow \underset{\forall s \in N(t), \forall e \in E(s,t)}{\text{Aggregate}} \left( \text{Extract}(H^{l-1}[s]; H^{l-1}[t], e) \right)$$

where N(t) denotes all the source nodes of target node t, and E(s,t) denotes all the edges from node s to t. The Extract( ) function extracts useful information from source node's representation $H^{(l-1)}[s]$, with the target node's representation $H^{l-1}[t]$ and the edge e between the two nodes query. The Aggregate( ) function gathers the neighborhood information of source nodes via one or more aggregation operators, such as mean, max, etc.

Building off the success of attention as used by the Transformer model (as described in Vaswani, supra), attention-based GNNs (AGNNs) have been developed (see K. Thekumparampil et al., "Attention-based graph neural network for semi-supervised learning," arXiv:1803.03735 [stat.ML] 10 Mar. 2018, available at arxiv.org/pdf/1803.03735.pdf, which is incorporated herein by reference. The HGT model is one type of AGNN that combines the strength of GNNs and Transformer in order to handle heterogeneous graph structure data (as described in Z. Hu et al, "Heterogeneous Graph Transformer," arXiv: 2003.01332v1 [cs.LG] 3 Mar. 2020, available at arxiv.org/pdf/2003.01332.pdf, which is incorporated herein by reference).

Figure 8:
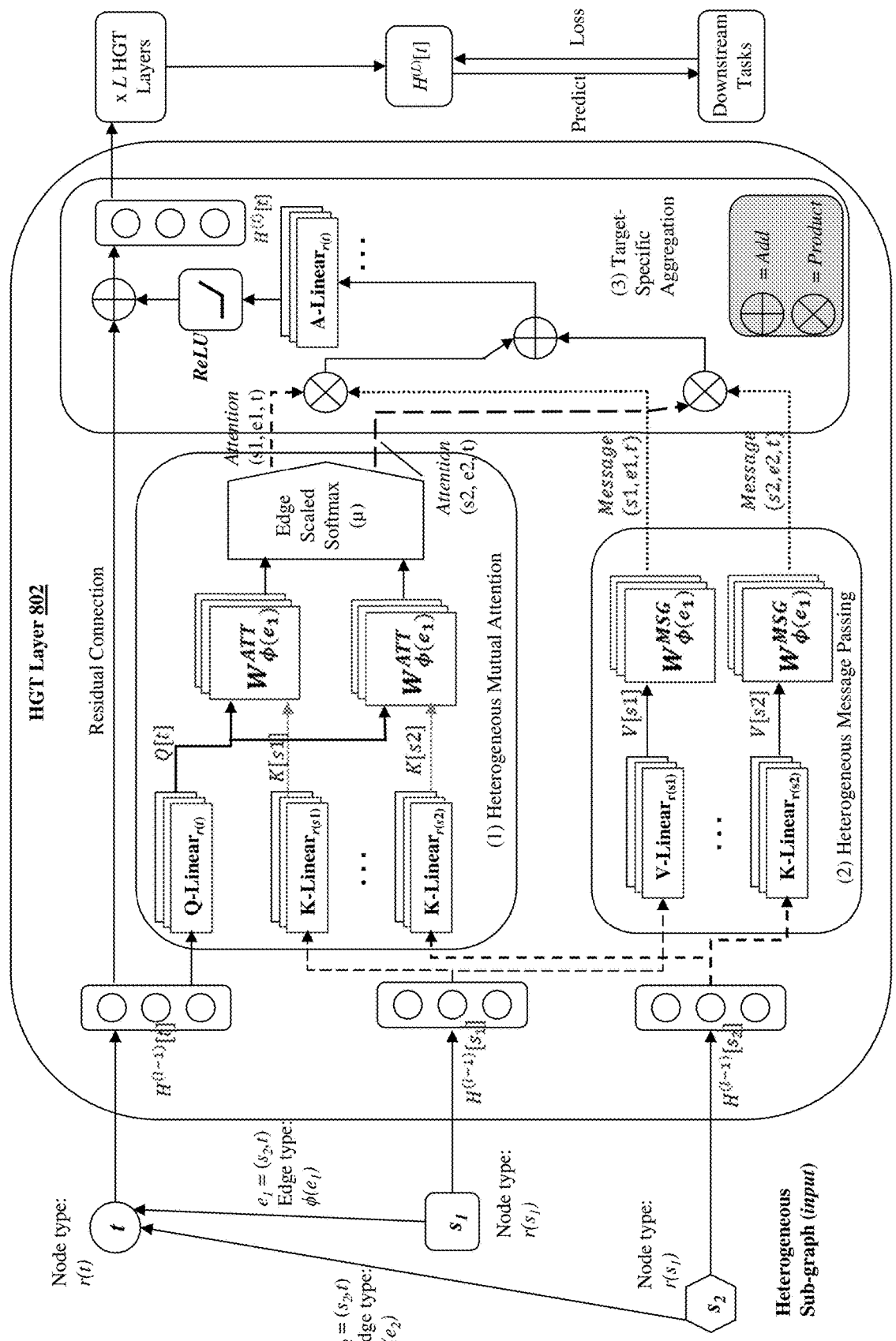
FIG. 8 is a diagram of an exemplary architecture of a Heterogeneous Graph Transformer (HGT) layer of the graph-based group intent classifier.

FIG. 8 is a diagram of an exemplary architecture of an HGT layer of classifier 109b. As shown in FIG. 8, the HGT layer 802 extracts from the input heterogeneous graph data structure all linked node pairs, where target node t is linked by source node s via edge e. The goal of HGT layer 802 is to aggregate information from source nodes to get the representation of a target node. The layer 802 includes three components: (1) a Heterogeneous Mutual Attention (HMA) process, (2) a Heterogeneous Message Passing (HMP) process, and (3) a Target-Specific Aggregation (TSA) process.

The HMA process calculates mutual attention between source node s and target node t, which estimates the importance of each source node. The following equation provides the detailed calculation of mutual attention as performed by the HMA process:

$$\text{Attention}_{HGT}(s, e, t) = \underset{\forall s \in N(t)}{\text{Softmax}}\left(\underset{i \in [1, h]}{\|} ATT\text{-head}^i(s, e, t)\right)$$

$$ATT\text{-head}^i(s, e, t) = \left(K^i(s) W_{\phi(e)}^{ATT} Q^i(t)^T\right) \cdot \frac{\mu(r(s), \phi(e), r(t))}{\sqrt{d}}$$

$$K^i(s) = K\text{-Linear}_{r(s)}^i(H^{(l-1)}[s])$$

$$Q^i(t) = Q\text{-Linear}_{r(t)}^i(H_{(l-1)}[t])$$

As the inner product means projection of one vector on another, in Transformer when it focuses on one vector q in matrix Q, it also gives more attention on vectors that in matrix K have a larger inner product with vector q. As shown above, similar to Transformer, to improve the model's fit ability, linear transformation is added when generating K and Q. Also, because there are different edge types in node pairs, a different matrix W based on different edge type(s) is added when calculating the product between the K and Q vectors. Finally, the results are converted to the range of 0 to 1 by the softmax function to make it reasonably usable as attention.

The HMP process, as shown in the equation below, calculates passing information from source nodes to target node:

$$\text{Message}_{HGT}(s, e, t) = \underset{i \in [1, h]}{\|} MSG\text{-head}^i(s, e, t)$$

$$MSG\text{-head}^i(s, e, t) = M\text{-Linear}_{r(s)}^i(H^{(l-1)}[s]) W_{\phi(e)}^{MSG}$$

Take node pair (t, s₁, e₁) for example, considering the different distribution of different node types and edge types, HMP incorporates node-type based linear transformation and edge-type based matrix W when calculating messages passing from source node s₁ to target node t.

The TSA process, as shown in the equation below, uses attention vectors as the weight to average the corresponding messages from source nodes to get the updated vector for target node t:

$$\tilde{H}^{(l)}[t] = \underset{\forall s \in N(t)}{\oplus} (\text{Attention}_{HGT}(s, e, t) \cdot \text{Message}_{HGT}(s, e, t))$$

$$H^{(l)}[t] = \sigma\left(A\text{-Linear}_{r(t)} \tilde{H}^{(l)}[t]\right) + H^{(l-1)}[t]$$

TSA aggregates all the messages from source nodes through addition operation. Also, considering the different feature distribution of different node types, the updated messages are projected by linear transformation based on different target node type. Target node t's representation of (l)-th HGT layer is the sum of its representation of (l−1)-th HGT layer and the passing messages from all its source nodes.

As mentioned above, the output of classifier 109b is a second predicted intent for each utterance group based upon the corresponding graph data structure.

combines (step 210), for each utterance group, the first predicted intent from classifier 108b and the second predicted intent from classifier 109b to generate a final predicted intent. In some embodiments, module 110 uses a voting strategy algorithm to determine the final predicted intent, as shown in Table 1 below:

TABLE 1

| | First Predicted Intent (from Classifier 108b) | Second Predicted Intent (from Classifier 109b) | Final Predicted Intent |
| --- | --- | --- | --- |
| 1 | Intent category A | Intent category A | Intent category A |
| 2 | Intent category A | Intent category B | Intent category A |
| 3 | Inconclusive | Intent category A | Intent category A |

As shown above, if a utterance group is labeled with same intent category A by each of the two classifiers 108b and 109b, then module 110 determines that the utterance group should be labeled with intent category A. If classifier 108b labels the utterance group as intent category A, while classifier 109b labels the utterance group as intent category B, then the utterance group should be labeled with classifier 108b's prediction of intent category A. If classifier 108a is unable to predict an intent (inconclusive) based upon, e.g., not being able to comprehend the messages in the utterance group, and classifier 109b labels the utterance group as intent category A, the utterance group should be labeled with classifier 109b's prediction of intent category A. It should be appreciated that other types of ensemble voting or determination can be used by module 110.

Once the final predicted intent is determined for each utterance group as described above, overlap determination module 111 performs a different sequence of steps depending upon whether the utterance group comprises incomprehensible user messages or comprehensible user messages. For groups with incomprehensible user messages, prediction generation module 110 determines (step 212a) whether the final predicted intent overlaps with the final predicted intent for other utterance groups. For groups with comprehensible user messages, module 11 determines (step 214a) whether the final predicted intent overlaps with a preassigned intent for other utterances groups. For example, if system 100 generates and analyzes five utterance groups (Groups 1, 2, 3, 4, 5) from a corpus of message logs, three of the utterance groups (Groups 1, 3, 4) may be labeled with intent category A and two of the utterance groups (Groups 2, 5) may be labeled with intent category B. Using this example, module 111 can determine that the intents for Groups 1, 3, and 4 overlap because they are labeled with the same intent category. Likewise, module 111 can determine that the intents for Groups 2 and 5 overlap.

After determining overlap, in the case where the utterance groups have incomprehensible user messages, module 111 selects (step 212b) one or more messages in the utterance group having no overlapping intent to create one or more new intents based on the selected messages. In the case where the utterances groups have comprehensible messages, module 111 combines (step 214b) the messages in the utterances that have an overlapping intent to create a new utterance group and label the utterance group with the overlapping intent. Continuing with the above example, module 111 captures the user messages contained in each of Groups 1, 3 and 4 (e.g., an overlapping intent) and aggregates the user messages into a single utterance group (Group 6). Module 111 labels this new utterance group with intent category A, and stores the new utterance group with the messages and corresponding intent label in, e.g., VA training database 112b. Module 111 performs the same actions for Groups 2 and 5—namely, capturing the user messages in these groups and aggregating them into a single utterance group (Group 7), then storing the new group with the messages and intent label in database 112b.

Once the overlapping utterance groups are aggregated as described above, system 100 can utilize the new utterance groups, messages and intents to retrain an NLP/NLU processing engine of VA application 103 to identify an intent of one or more incoming messages based upon the new utterance group. VA application 103 can leverage the refinement of utterance groups and labeled intents as performed by server computing device 106 to improve the performance and accuracy of its NLP/NLU processing. For a given user utterance, VA application 103 may incorrectly determine an intent prior to refinement due to, e.g., an erroneously-labeled intent. After retraining, however, VA application 103 has corrected the error in intent for the user utterance and is able to provide relevant information in response to the utterance.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for automatic refinement of intent classification for virtual assistant applications, the system comprising a computing device having a memory that stores computer-executable instructions and a processor that executes the computer-executable instructions to:
    create a plurality of utterance groups using messages from a corpus of virtual assistant message logs, each utterance group comprising either one or more incomprehensible messages or one or more comprehensible messages;
    determine, using a first machine learning classifier comprising a Bidiretional Encoder Representation from Transformers (BERT) classifier, a first predicted intent associated with each utterance group using the messages in the utterance group as input to the first machine learning classifier, comprising:
        generating a multidimensional embedding for each message in the utterance group, the embedding based upon one or more of token embedding, segment embedding, and positional embedding,
        classifying the multidimensional embedding using the first machine learning classifier to assign a predicted intent to the corresponding message, and
        determining the first predicted intent associated with the utterance group based upon the predicted intent assigned to each message in the utterance group;
    generate a graph data structure based upon the plurality of utterance groups, the graph data structure comprising a first plurality of intent category nodes, a second plurality of utterance group nodes, a third plurality of utterance nodes, and a fourth plurality of key-phrase nodes;
    determine, using a second machine learning classifier, a second predicted intent associated with each utterance group using the graph data structure as input to the second machine learning classifier;
    combine, for each utterance group, the first predicted intent for the utterance group and the second predicted intent for the utterance group to generate a final predicted intent for the utterance group;
    determine, for each utterance group generated from incomprehensible utterances, whether the final predicted intent for the utterance group overlaps with the final predicted intent for other utterance groups and select one or more messages in an utterance group with a final predicted intent that does not overlap with a final predicted intent for other utterance groups to create one or more new intents based on the selected messages; and
    determine, for each utterance group generated from comprehensible utterances, whether the final predicted intent for the utterance group overlaps with a pre-assigned intent for other utterance groups to thereby determine utterance groups that have a final predicted intent that overlaps with a pre-assigned intent, and combine messages in the utterance groups that have the final predicted intent that overlaps with the pre-assigned intent to create a new utterance group and label the new utterance group with the final predicted intent that overlaps with the pre-assigned intent.

2. The system of claim 1, wherein creating a plurality of utterance groups each comprising one or more messages from a corpus of virtual assistant message logs comprises:
    determining a subset of messages from the corpus of virtual assistant message logs that are associated with an existing intent classification; and
    assigning the subset of messages to an utterance group.

3. The system of claim 1, wherein generating a graph data structure based upon the plurality of utterance groups comprises:
    determining a plurality of intent categories associated with the corpus of virtual assistant message logs and generating the first plurality of intent category nodes based upon the intent categories;
    generating the second plurality of utterance group nodes based upon the plurality of utterance groups;
    generating the third plurality of utterance nodes based upon the messages in each utterance group; and
    selecting, for each intent category, a plurality of key-phrases from the corpus of virtual assistant message logs associated with the intent category and generating the fourth plurality of key-phrase nodes based upon the key-phrases.

4. The system of claim 3, wherein:
    each node in the first plurality of intent category nodes is connected to one or more nodes in the second plurality of utterance group nodes;
    each node in the second plurality of utterance group nodes is connected to one or more nodes in the third plurality of utterance nodes; and
    one or more nodes in the third plurality of utterance nodes is connected to a key-phrase node.

5. The system of claim 3, wherein selecting a plurality of key-phrases from the corpus of virtual assistant message logs associated with the intent category comprises:
    executing a term frequency-inverse document frequency (TF-IDF) algorithm on the corpus of virtual assistant message logs associated with the intent category to identify a plurality of key-phrases; and selecting the identified key-phrases from the corpus of virtual assistant message logs associated with the intent category.

6. The system of claim 1, wherein determining a second predicted intent associated with each utterance group using the graph data structure as input to the second machine learning classifier comprises:
generating a multidimensional embedding for each node in the graph data structure;
classifying the multidimensional embedding using the second machine learning classifier to assign a predicted intent to each utterance group node in the graph data structure; and
determining the second predicted intent associated with the utterance group based upon the predicted intent assigned to the corresponding utterance group node.

7. The system of claim 6, wherein the second machine learning classifier is a graph neural network (GNN) classifier.

8. The system of claim 1, wherein combining the first predicted intent for the utterance group and the second predicted intent for the utterance group to generate a final predicted intent for the utterance group comprises:
assigning the first predicted intent to the utterance group as the final predicted intent, when the first machine learning classifier is able to generate the first predicted intent; and
assigning the second predicted intent to the utterance group as the final predicted intent, when the first machine learning classifier is unable to generate the first predicted intent.

9. The system of claim 1, wherein the computing device retrains a virtual assistant application to identify an intent of one or more incoming messages based upon the new utterance group.

10. A computerized method of automatic refinement of intent classification for virtual assistant applications, the method comprising:
creating, by a server computing device, a plurality of utterance groups each comprising one or more messages from a corpus of virtual assistant message logs;
determining, by the server computing device using a first machine learning classifier comprising a Bidiretional Encoder Representation from Transformers (BERT) classifier, a first predicted intent associated with each utterance group using the messages in the utterance group as input to the first machine learning classifier comprising:
generating a multidimensional embedding for each message in the utterance group, the embedding based upon one or more of token embedding, segment embedding, and positional embedding,
classifying the multidimensional embedding using the first machine learning classifier to assign a predicted intent to the corresponding message, and
determining the first predicted intent associated with the utterance group based upon the predicted intent assigned to each message in the utterance group;
generating, by the server computing device, a graph data structure based upon the plurality of utterance groups, the graph data structure comprising a first plurality of intent category nodes, a second plurality of utterance group nodes, a third plurality of utterance nodes, and a fourth plurality of key-phrase nodes;
determining, by the server computing device using a second machine learning classifier, a second predicted intent associated with each utterance group using the graph data structure as input to the second machine learning classifier;
combining, by the server computing device for each utterance group, the first predicted intent for the utterance group and the second predicted intent for the utterance group to generate a final predicted intent for the utterance group;
determining, for each utterance group generated from incomprehensible utterances, whether the final predicted intent for the utterance group overlaps with the final predicted intent for other utterance groups and select one or more messages in an utterance group with a final predicted intent that does not overlap with a final predicted intent for other utterance groups to create one or more new intents based on the selected messages; and
determining, for each utterance group generated from comprehensible utterances, whether the final predicted intent for the utterance group overlaps with a pre-assigned intent for other utterance groups to thereby determine utterance groups that have a final predicted intent that overlaps with a pre-assigned intent, and combine messages in the utterance groups that have the final predicted intent that overlaps with the pre-assigned intent to create a new utterance group and label the new utterance group with the final predicted intent that overlaps with the pre-assigned intent.

11. The method of claim 10, wherein creating a plurality of utterance groups each comprising one or more messages from a corpus of virtual assistant message logs comprises:
determining a subset of messages from the corpus of virtual assistant message logs that are associated with an existing intent classification; and
assigning the subset of messages to an utterance group.

12. The method of claim 10, wherein generating a graph data structure based upon the plurality of utterance groups comprises:
determining a plurality of intent categories associated with the corpus of virtual assistant message logs and generating the first plurality of intent category nodes based upon the intent categories;
generating the second plurality of utterance group nodes based upon the plurality of utterance groups;
generating the third plurality of utterance nodes based upon the messages in each utterance group; and
selecting, for each intent category, a plurality of key-phrases from the corpus of virtual assistant message logs associated with the intent category and generating the fourth plurality of key-phrase nodes based upon the key-phrases.

13. The method of claim 12, wherein:
each node in the first plurality of intent category nodes is connected to one or more nodes in the second plurality of utterance group nodes;
each node in the second plurality of utterance group nodes is connected to one or more nodes in the third plurality of utterance nodes; and
one or more nodes in the third plurality of utterance nodes is connected to a key-phrase node.

14. The method of claim 12, wherein selecting a plurality of key-phrases from the corpus of virtual assistant message logs associated with the intent category comprises:
executing a term frequency-inverse document frequency (TF-IDF) algorithm on the corpus of virtual assistant message logs associated with the intent category to identify a plurality of key-phrases; and selecting the identified key-phrases from the corpus of virtual assistant message logs associated with the intent category.

15. The method of claim 10, wherein determining a second predicted intent associated with each utterance group using the graph data structure as input to the second machine learning classifier comprises:
   generating a multidimensional embedding for each node in the graph data structure;
   classifying the multidimensional embedding using the second machine learning classifier to assign a predicted intent to each utterance group node in the graph data structure; and
   determining the second predicted intent associated with the utterance group based upon the predicted intent assigned to the corresponding utterance group node.

16. The method of claim 15, wherein the second machine learning classifier is a graph neural network (GNN) classifier.

17. The method of claim 10, wherein combining the first predicted intent for the utterance group and the second predicted intent for the utterance group to generate a final predicted intent for the utterance group comprises:
   assigning the first predicted intent to the utterance group as the final predicted intent, when the first machine learning classifier is able to generate the first predicted intent; and
   assigning the second predicted intent to the utterance group as the final predicted intent, when the first machine learning classifier is unable to generate the first predicted intent.

18. The method of claim 10, wherein the computing device retrains a virtual assistant application to identify an intent of one or more incoming messages based upon the new utterance group.

* * * * *